United States Patent
He et al.

(10) Patent No.: US 12,483,707 B2
(45) Date of Patent: Nov. 25, 2025

(54) METHOD, APPARATUS, AND DEVICE FOR PROCESSING VIDEO DATA AND COMPUTER STORAGE MEDIUM

(71) Applicants: Beijing BOE Display Technology Co., Ltd., Beijing (CN); BOE Technology Group Co., Ltd., Beijing (CN)

(72) Inventors: Huidong He, Beijing (CN); Peng Han, Beijing (CN); Hao Zhang, Beijing (CN); Lili Chen, Beijing (CN); Qianwen Jiang, Beijing (CN); Ruifeng Qin, Beijing (CN); Juanjuan Shi, Beijing (CN); Weihua Du, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/275,377

(22) PCT Filed: Sep. 20, 2022

(86) PCT No.: PCT/CN2022/120008
§ 371 (c)(1),
(2) Date: Aug. 1, 2023

(87) PCT Pub. No.: WO2023/093240
PCT Pub. Date: Jun. 1, 2023

(65) Prior Publication Data
US 2024/0098270 A1    Mar. 21, 2024

(30) Foreign Application Priority Data
Nov. 26, 2021 (CN) .......................... 202111421766.3

(51) Int. Cl.
*H04N 19/137* (2014.01)
*H04N 19/14* (2014.01)
(Continued)

(52) U.S. Cl.
CPC .......... *H04N 19/137* (2014.11); *H04N 19/14* (2014.11); *H04N 19/159* (2014.11); *H04N 19/176* (2014.11)

(58) Field of Classification Search
None
See application file for complete search history.

(56) References Cited

U.S. PATENT DOCUMENTS

2006/0239571 A1* 10/2006 Dong .................. G06T 7/238
                                                                382/236
2012/0082228 A1*  4/2012 Su ...................... H04N 19/70
                                                                375/E7.125

(Continued)

FOREIGN PATENT DOCUMENTS

CN       1222041 A       7/1999
CN     102075757 A       5/2011

(Continued)

OTHER PUBLICATIONS

Zhentang, Jia, et al. "A Video Object Segment Algorithm Based on Moving Edge Detection." journal of computer research and development (2003): 684-689.

(Continued)

*Primary Examiner* — Edemio Navas, Jr.
(74) *Attorney, Agent, or Firm* — IPro, PLLC

(57) ABSTRACT

Provided is a method for processing video data. The method includes: acquiring a second outline of at least one object in an $(n+1)^{th}$ image frame of a to-be-compressed video data group based on a fuzzy algorithm; determining a motion vector of the at least one object according to the second (Continued)

outline and a first outline of the at least one object in an $n^{th}$ image frame of the to-be-compressed video data group; acquiring compressed video data according to the motion vector and a start image frame of to-be-compressed video data; and sending the compressed video data to an apparatus for displaying images.

17 Claims, 8 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2014/0085545 A1* | 3/2014 | Tu | G06F 18/254 |
| | | | 348/E9.047 |
| 2015/0341636 A1 | 11/2015 | Tsai et al. | |
| 2022/0201359 A1* | 6/2022 | Porter | H04N 21/64723 |
| 2022/0207851 A1* | 6/2022 | Saputra | G11B 27/031 |
| 2022/0321899 A1* | 10/2022 | Matsuba | H04N 19/18 |
| 2023/0030020 A1 | 2/2023 | Li et al. | |

FOREIGN PATENT DOCUMENTS

| | | |
|---|---|---|
| CN | 104380745 B | 4/2018 |
| CN | 108769690 A | 11/2018 |
| CN | 108972545 A | 12/2018 |
| CN | 112203095 A | 1/2021 |
| CN | 113313774 A | 8/2021 |
| CN | 113411581 A | 9/2021 |
| CN | 114040203 A | 2/2022 |
| DE | 10312162 A1 | 10/2004 |
| KR | 20160128972 A | 11/2016 |

OTHER PUBLICATIONS

CN202111421766.3 first office action.

* cited by examiner

METHOD, APPARATUS, AND DEVICE FOR PROCESSING VIDEO DATA AND COMPUTER STORAGE MEDIUM

CROSS-REFERENCE TO RELATED APPLICATION

This application is a U.S. national phase application based on PCT/CN2022/120008, filed on Sep. 20, 2022, which claims priority to Chinese Patent Application No. 202111421766.3, filed Nov. 26, 2021 and entitled "METHOD, APPARATUS, AND DEVICE FOR PROCESSING VIDEO DATA, AND COMPUTER STORAGE MEDIUM", all of which are hereby incorporated herein by reference in their entireties for all purposes.

TECHNICAL FIELD

The present disclosure relates to the field of video compression and wireless communications, and in particular, relates to a method, an apparatus, and a device for processing video data, and a computer storage medium.

BACKGROUND

At present, in a process of processing video data processing, a video is usually processed into video data for transmission by a method for processing video data. The method for processing video data processing is a method for converting a file in an original video format into a file in another video format by a compression technology. The method for processing video data is the premise of processing videos by a computer. A video signal has an extremely high data bandwidth upon being digitalized, which is usually more than 20 MB/sec, such that it is difficult for the computer to store and process the video signal. The data bandwidth is usually reduced to 1-10 MB/s by using the compression technology, such that the video signal is stored in the computer and correspondingly processed.

SUMMARY

Embodiments of the present disclosure provide a method, an apparatus, and a device for processing video data, and a computer storage medium. The technical solutions are as follows. According to a first aspect of the present disclosure, a method for processing video data is provided. The method is applied to a field of video compression and wireless communication, and includes:
  acquiring a to-be-compressed video data group;
  acquiring, in the to-be-compressed video data group, a motion vector of at least one object in at least two adjacent image frames;
  acquiring compressed video data based on a start image frame of the to-be-compressed video data group and the motion vector of the at least one object in the at least two adjacent image frames; and
  sending the compressed video data to an apparatus for displaying images,
  wherein acquiring, in the to-be-compressed video data group, the motion vector of the at least one object in the at least two adjacent image frames includes:
  acquiring a first outline of the at least one object in an $n^{th}$ image frame of the to-be-compressed video data group, wherein $n \geq 1$;
  acquiring, based on the first outline, a second outline of the at least one object in an $(n+1)^{th}$ image frame of the to-be-compressed video data group by a fuzzy algorithm; and
  determining the motion vector of the at least one object based on the first outline and the second outline.

Optionally, acquiring, based on the first outline, the second outline of the at least one object in the $(n+1)^{th}$ image frame of the to-be-compressed video data group by the fuzzy algorithm includes:
  acquiring a plurality of pixels in a target region in the $(n+1)^{th}$ image frame based on the target region where a first pixel on the first outline is located;
  determining a fuzzy membership function and a fuzzy control formula of an inter-frame similarity between the first pixel and the plurality of pixels according to color difference values between the first pixel and the plurality of pixels, wherein the fuzzy membership function is configured to output, based on difference values between each of the plurality of pixels and the first pixel, a probability that a sub-pixel of each of the pixels belongs to a negative set, a zero set, or a positive set, and the fuzzy control formula is configured to determine, according to an output of the fuzzy membership function, a probability that each of the pixels belongs to a matched set and a probability that each of the pixels belongs to an unmatched set;
  acquiring a similarity between each of the pixels and the first pixel by defuzzifying the probability that each of the pixels belongs to the matched set and the probability that each of the pixels belongs to the unmatched set;
  determining pixels with similarities greater than a first threshold as target pixels; and
  acquiring the second outline based on the target pixels.

Optionally, images of the to-be-compressed video data group include a plurality of macroblocks, and the target region is a macroblock where the first pixel is located.

Optionally, acquiring the to-be-compressed video data group includes:
  acquiring to-be-compressed video data; and
  dividing the to-be-compressed video data into a plurality of to-be-compressed video data groups based on a luminance difference value and a chroma difference value, wherein one to-be-compressed video data group includes a plurality consecutive image frames.

Optionally, acquiring the compressed video data based on the start image frame of the to-be-compressed video data group and the motion vector of the at least one object in the at least two adjacent image frames includes:
  acquiring energy of a low-frequency component of each macroblock in the start image frame;
  determining energy difference values between energy of a target macroblock in the start image frame and energy of each macroblock other than the target macroblock;
  acquiring intra-frame compressed data of the start image frame by performing intra-frame compression on the start image frame based on the energy difference values; and
  acquiring the compressed video data based on the intra-frame compressed data and the motion vector of the at least one object in two adjacent image frames.

Optionally, acquiring the intra-frame compressed data of the start image frame by performing the intra-frame compression on the start image frame based on the energy difference values includes:

determining macroblocks with an energy difference value between energy of the macroblock and energy of the target macroblock greater than a second threshold as data macroblocks; and acquiring the intra-frame compressed data based on the target macroblocks and the data macroblocks.

Optionally, prior to acquiring the to-be-compressed video data group, the method further includes:

acquiring a resolution of the to-be-compressed video data;

determining, based on a preset resolution list, an identifier corresponding to the resolution; and sending the identifier to the apparatus for displaying images.

According to another aspect of the present disclosure, an apparatus for processing video data is provided. The apparatus for processing video data includes:

a data group acquiring module, configured to acquire a to-be-compressed video data group;

a motion vector acquiring module, configured to acquire, in the to-be-compressed video data group, a motion vector of at least one object in at least two adjacent image frames;

a video data acquiring module, configured to acquire compressed video data based on a start image frame of the to-be-compressed video data group and the motion vector of the at least one object in the at least two adjacent image frames; and a video data sending module, configured to send the compressed video data to an apparatus for displaying images, wherein the motion vector acquiring module includes:

a first outline acquiring unit, configured to acquire a first outline of the at least one object in an $n^{th}$ image frame of the to-be-compressed video data group, wherein n≥1;

a second outline acquiring unit, configured to acquire, based on the first outline, a second outline of the at least one object in an $(n+1)^{th}$ image frame of the to-be-compressed video data group by a fuzzy algorithm; and a motion vector determining unit, configured to determine the motion vector of the at least one object based on the first outline and the second outline.

Optionally, the apparatus for processing video data further includes:

a pixel acquiring module, configured to acquire a plurality of pixels in a target region in the $(n+1)^{th}$ image frame based on the target region where a first pixel on the first outline is located;

a probability determining module, configured to determine a fuzzy membership function and a fuzzy control formula of an inter-frame similarity between the first pixel and the plurality of pixels according to color difference values between the first pixel and the plurality of pixels, wherein the fuzzy membership function is configured to output, based on difference values between each of the plurality of pixels and the first pixel, a probability that a sub-pixel of each pixel belongs to a negative set, a zero set, or a positive set, and the fuzzy control formula is configured to determine, according to an output of the fuzzy membership function, a probability that each of the pixels belongs to a matched set and a probability that each of the pixels belongs to an unmatched set;

a similarity acquiring module, configured to acquire a similarity between each of the pixels and the first pixel by defuzzifying the probability that each of the pixels belongs to the matched set and the probability that each of the pixels belongs to the unmatched set; and a target pixel determining module, configured to determine pixels with similarities greater than a first threshold as target pixels, wherein the target pixels are pixels, corresponding to the first pixel, in the second outline.

Optionally, the apparatus for processing video data further includes:

a to-be-compressed video data acquiring module, configured to acquire to-be-compressed video data; and a to-be-compressed video data group acquiring module, configured to divide the to-be-compressed video data into a plurality of to-be-compressed video data groups based on a luminance difference value and a chroma difference value, wherein one to-be-compressed video data group includes a plurality of consecutive image frames.

According to another aspect of the present disclosure, a device for processing video data is provided. The device for processing video data includes a processor and a memory storing at least one instruction, at least one program, a code set, or an instruction set, wherein the at least one instruction, the at least one program, the code set, or the instruction set, when loaded and executed by the processor, causes the processor to perform the above method for processing video data.

According to another aspect of the present disclosure, a computer storage medium is provided. The computer storage medium stores at least one instruction, at least one program, a code set, or an instruction set therein, wherein the at least one instruction, the at least one program, the code set, or the instruction set, when loaded and executed by the processor, causes the processor to perform the above method for processing video data.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

Figure 1:
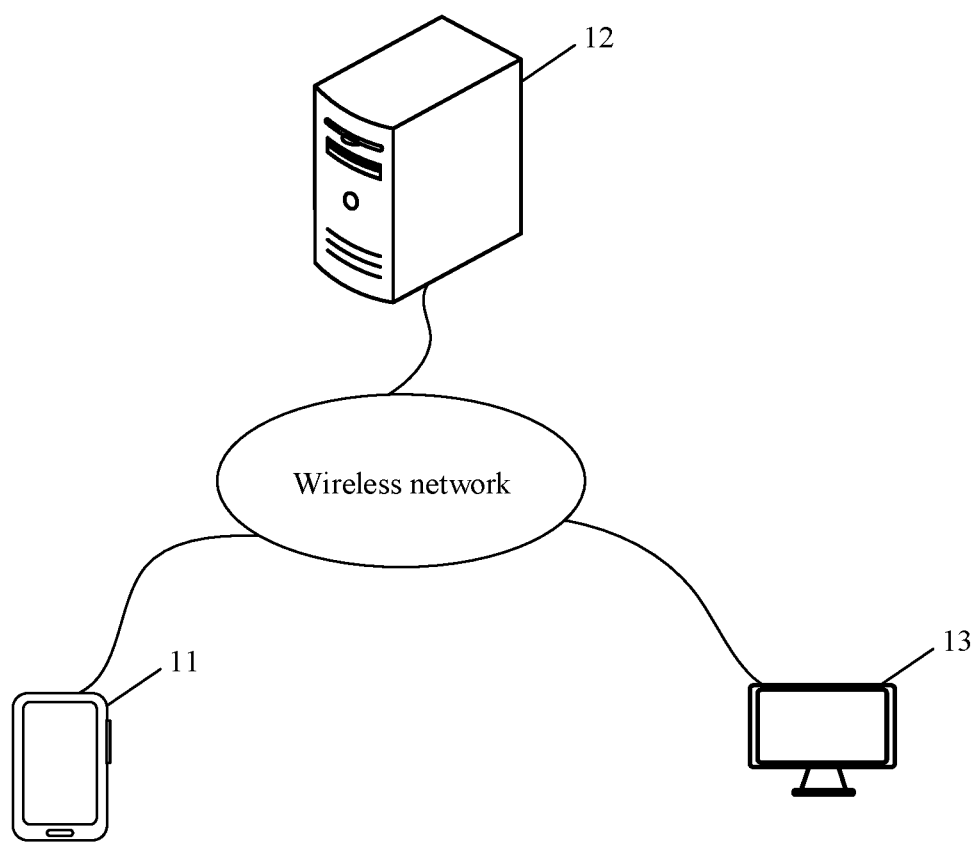
FIG. 1 is a schematic diagram of an implementation environment of a method for processing video data according to embodiments of the present disclosure.

The above drawings have shown the explicit embodiments of the present disclosure, which are described below in detail. These drawings and text descriptions are not intended to limit the scope of the conception of the present disclosure in any way, but to illustrate the concept of the present disclosure to those skilled in the art with reference to specific embodiments.

DETAILED DESCRIPTION

To make the objectives, technical solutions, and advantages of the present disclosure clearer, embodiments of the present disclosure are described in detail below with reference to the accompanying drawings.

A method for processing video data is also referred to as a method for wireless same-screen method, a method for flying a screen, or a method for sharing a screen. Specifically, a picture of a mobile device A (such as a mobile phone, a tablet, a notebook, or a computer) is displayed on a screen B (a tablet, a notebook, a computer, a television set, an all-in-one machine, or a projector) of another device in real time by a certain technical method, and output contents include various types of media information and a real-time operation picture. At present, the principle of the method for processing video data is that a source compresses a to-be-transmitted streaming media and transmits the streaming media via a proper network protocol, and a sink performs corresponding decoding and playing.

The streaming media refers to a technology and process of compressing a series of media data, sending the data in segments via the Internet, and transmitting videos and audios on the Internet in real time for watching. This technology enables data packets to be sent like flowing water. In the case that this technology is not used, an entire media file needs to be downloaded prior to use. The streaming media actually refers to a new media transmission manner, such as an audio stream, a video stream, a text stream, an image stream, and an animation stream. In a process of processing wireless video data, video streaming transmission is mainly used. A video is a continuous image sequence and is composed of consecutive frames. One frame is an image. The method for processing video data includes a method of compressing a video and sending the compressed video to an apparatus for displaying images.

At present, in the related art, H.264 of the commonly used method for processing video data is co-proposed by the international organization for standardization (ISO) and the international telecommunications union (ITU), and H.264 has the advantage of extremely high data compression ratio. However, H.264 may lose part of data during compression of a video, such that partial image details are lost in the compressed video received by the apparatus for displaying images. As a result, the display effect of video data acquired by the method for processing video data is relatively poor. Specifically, in the method for processing video data, a plurality of frames of images in a video are first grouped, and from a start frame of each group of images, a difference value between a latter frame and a previous frame adjacent to the latter frame is recorded by comparing the latter frame and the previous frame adjacent to the latter frame. In this way, the data volume is reduced to an extremely large extent, videos are compressed, and compressed video data is then sent to an apparatus for displaying images. However, in the above method, part of data is possibly lost during the compression of the video, which in turn leads to a poor display of the video data obtained by the method for processing video data.

The embodiments of the present disclosure provide a method for processing video data, which solves the problems in the related art above.

FIG. 1 is a schematic diagram of an implementation environment of a method for processing video data according to embodiments of the present disclosure. The implementation environment includes a first terminal 11, a processor, a server 12, and a second terminal 13.

The first terminal 11 is a terminal, such as a mobile phone, a tablet, a laptop, a smart wearable device, or the like. A program for processing video data is installed in the terminal.

The second terminal 13 is a terminal, such as a virtual reality (VR) headset, a tablet, a laptop, a TV set, a projector, or the like.

The server 12 is a server or a server cluster. The server includes a plurality of different resource libraries that have a large quantity of videos therein.

The first terminal 11 is connected to the server 11 in a wired or wireless manner (FIG. 1 shows a case in a Wi-Fi Direct manner). The first terminal 11 is connected to the second terminal 12 in a wireless manner. Exemplarily, the first terminal 11 is a mobile phone and the second terminal 13 is a VR headset. The mobile phone can achieve a same-screen display effect of the mobile phone and the VR headset through a Miracast technology.

The processor may be located in the first terminal 11, or located out of the first terminal 11. The first terminal 11 is connected to the processor in a wired or wireless manner, and the processor implements the method according to the embodiments of the present disclosure.

Application scenarios of the embodiments of the present disclosure include:

2D scenario video data in a mobile phone application is processed into the VR headset for 3D display. A wireless video data processing source application is installed on the mobile phone, and a wireless video data processing sink application is installed on the VR headset. The wireless video data processing source application and the wireless video data processing sink application are used in a matching manner, and the same network protocol and the same wireless video data processing technology are supported. The mobile phone compresses to-be-compressed video data that is about to be transmitted, and send compressed video data to a sink; and the sink performs corresponding decoding and playing.

Figure 2:
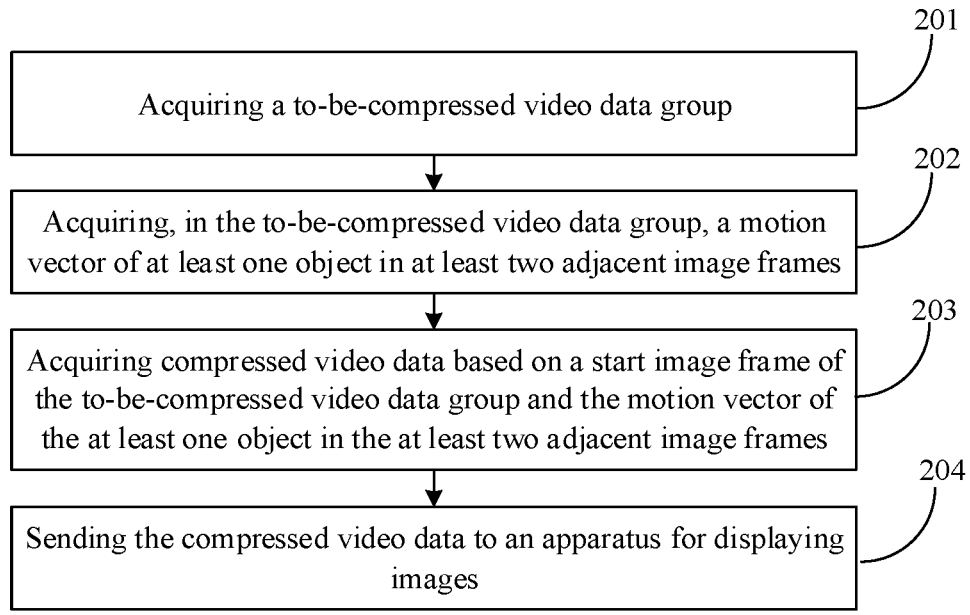
FIG. 2 is a flowchart of a method for processing video data according to embodiments of the present disclosure.

FIG. 2 is a flowchart of a method for processing video data according to embodiments of the present disclosure. The method is applicable to a field of video compression and wireless communication, and includes the following steps.

In 201, a to-be-compressed video data group is acquired.

In 202, a motion vector of at least one object in at least two adjacent image frames in the to-be-compressed video data group is acquired.

In 203, compressed video data is acquired based on a start image frame of the to-be-compressed video data group and the motion vector of the at least one object in the at least two adjacent image frames.

In 204, the compressed video data is sent to an apparatus for displaying images.

Figure 3:
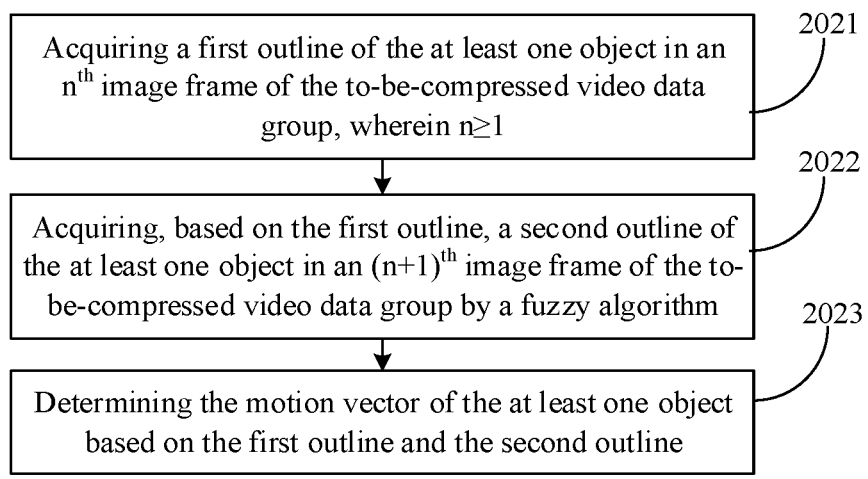
FIG. 3 is a flowchart of acquiring a motion vector in the method shown in FIG. 2.

As shown in FIG. 3, step 202 includes the following three sub-steps.

In 2021, a first outline of the at least one object in an $n^{th}$ image frame of the to-be-compressed video data group is acquired, wherein n≥1.

In 2022, based on the first outline, a second outline of the at least one object in an $(n+1)^{th}$ image frame of the to-be-compressed video data group is acquired by a fuzzy algorithm.

In 2023, the motion vector of the at least one object is determined based on the first outline and the second outline.

In summary, a method for processing video data is provided in the embodiments of the present disclosure. In the method, a second outline of at least one object in an $(n+1)^{th}$ image frame of a to-be-compressed video data group is acquired based on a fuzzy algorithm; a motion vector of the at least one object is determined according to the second outline and a first outline of the at least one object in an $n^{th}$ image frame of the to-be-compressed video data group; compressed video data is acquired according to the motion vector and a start image frame of to-be-compressed video data; and the compressed video data is sent to an apparatus for displaying images. Therefore, image details in the to-be-compressed video data are retained; data loss of the compressed video data is reduced; the problem of a poor video data processing effect of the method for processing video data probably caused by loss of part of data during compression of a video in the related art is solved; and the display effect of the video data acquired by the method for processing video data is improved.

Figure 4:
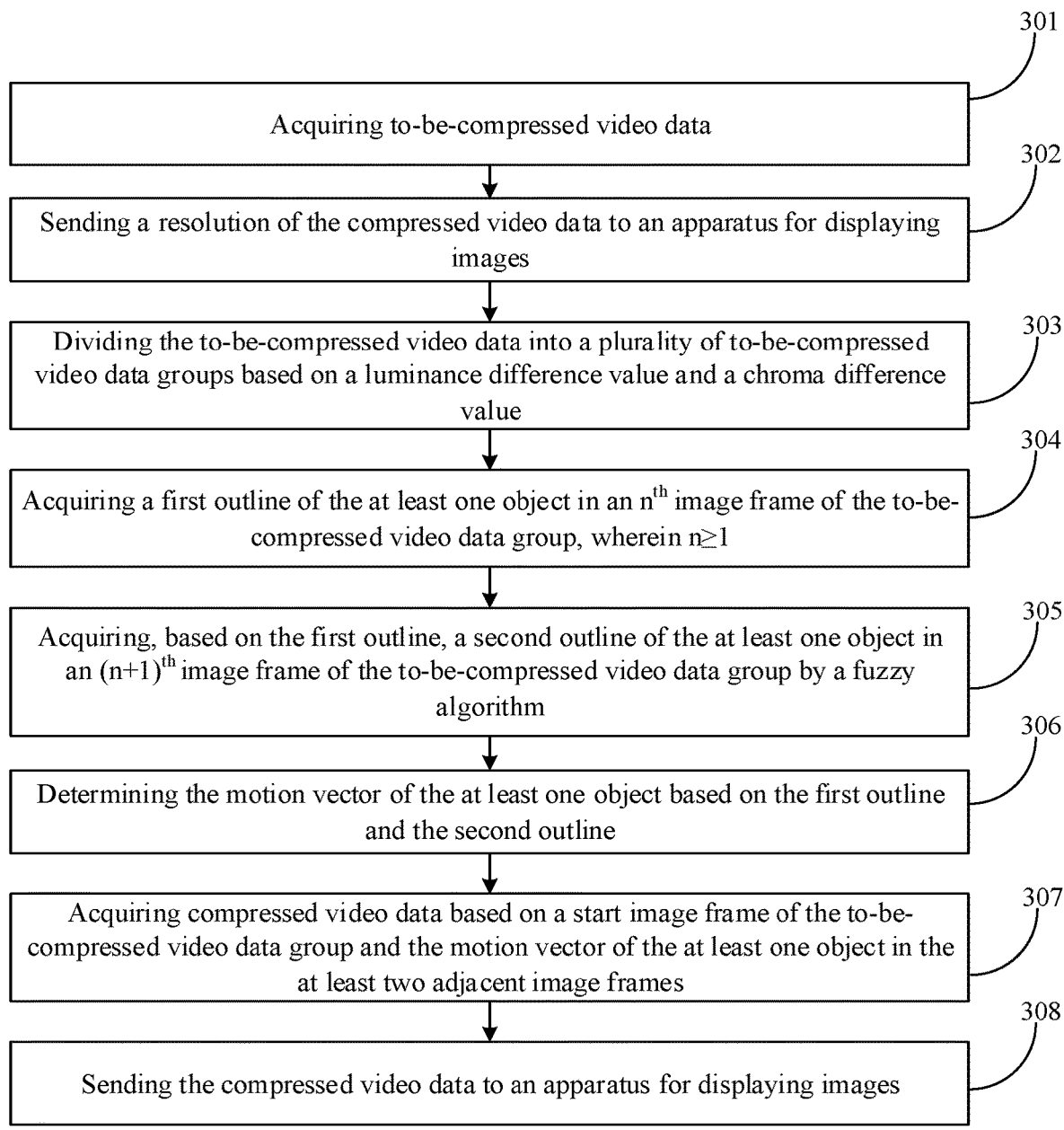
FIG. 4 is a flowchart of another method for processing video data according to embodiments of the present disclosure.

FIG. 4 is a flowchart of another method for processing video data according to embodiments of the present disclosure. The method includes the following steps.

In 301, to-be-compressed video data is acquired.

The to-be-compressed video data includes image data, or includes audio data and image data (for example, a video being played on a terminal, an application scenario being displayed on a terminal, or the like). The to-be-compressed video data is referred to as a source video. The source video is a video downloaded to a source (for example, a mobile phone) or a video played in real time on the source.

In 302, a resolution of the to-be-compressed video data is sent to the apparatus for displaying images.

The source detects the resolution of the to-be-compressed video data in real time, and the resolution is, for example, 720 p, 1080 p, or 4 k. Then, the source informs a sink of the detected resolution of the to-be-compressed video data, and the sink configures a corresponding decoder according to the received resolution of the to-be-compressed video data, such that displaying of a video data processing content is achieved.

Figure 5:
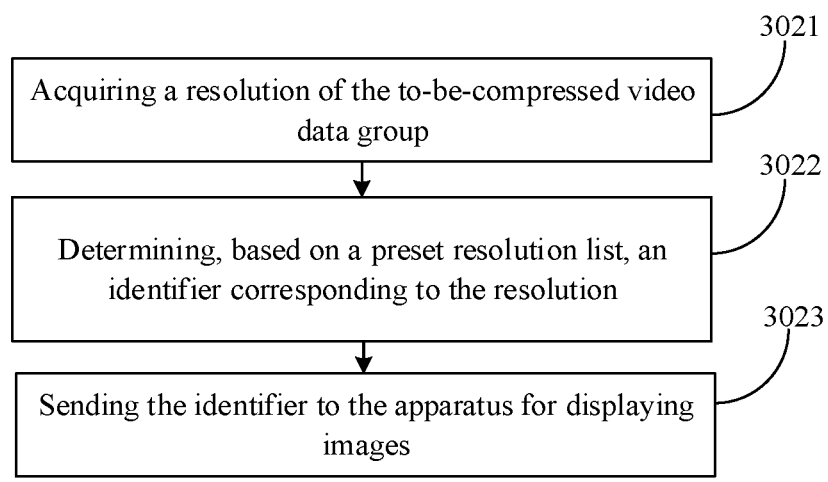
FIG. 5 is a flowchart of sending a resolution in the method shown in FIG. 4.

As shown in FIG. 5, step 302 includes the following three sub-steps.

In sub-step 3021, the resolution of the to-be-compressed video data is acquired.

The source detects the to-be-compressed video data in real time, such that the resolution of a to-be-compressed video is acquired. Alternatively, in an optional implementation, the source acquires the resolution of the to-be-compressed video data under a target condition, such that the data processing amount of the source is reduced. The target condition at least includes:

1) The source detects that a data source of the to-be-compressed video data is changed, for example, from a data source providing 720 p to another data source providing 1080 p.

2) The source pauses or restarts video playing, for example, the source pauses sending the compressed video data or restarts to send the compressed video data to the apparatus for displaying images under the control of a user.

In 3022, an identifier corresponding to the resolution is determined based on a preset resolution list.

First, a preset resolution list refers to category labeling of video resolutions supported by the method for processing video data, which can be labeled according to the size of the resolution. The resolution list supports 32 resolutions according to the international standard format. In the case that the method for processing video data is required to support videos with other resolutions, the resolutions and numerals corresponding to the resolutions is added based on the resolution list.

Exemplarily, the preset resolution list is as shown in Table 1.

TABLE 1

| Resolution list | |
|---|---|
| Numeral | Resolution |
| 0 | 640 × 480 p60 |
| 1 | 720 × 480 p60 |
| 2 | 1280 × 720 p30 |
| 3 | 1280 × 720 p60 |
| 4 | 1920 × 1080 p30 |
| 5 | 1920 × 1080 p60 |
| 6 | 3840 × 2160 p60 |
| 7 | 4096 × 2160 p60 |
| 8 | 5120 × 2160 p60 |
| . . . | . . . |
| 31 | 7680 × 4320 p60 |

As shown in Table 1, numeral 7 is configured to indicate that the resolution of the video is 4096×2160, with a frequency of 60 hz.

Secondly, identifiers corresponding to the resolutions in the table are determined based on the preset resolution list, and the identifiers are codes convenient for transmission.

Figure 6:
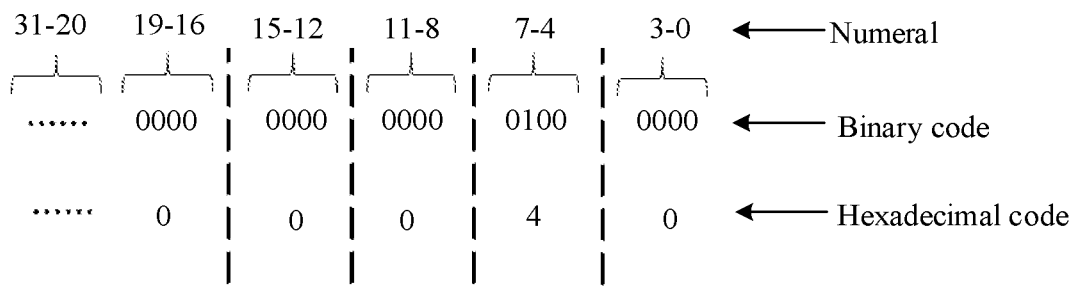
FIG. 6 is a schematic diagram of a resolution identifier according to embodiments of the present disclosure.

Exemplarily, as shown in FIG. 6, FIG. 6 is a schematic diagram of a resolution identifier according to embodiments of the present disclosure; A 32-bit binary code is set according to a quantity of the numerals of the resolutions in the resolution list, and every four adjacent bits in the 32-bit binary code correspond to one hexadecimal code to generate an 8-bit hexadecimal code, which is transmitted to the sink (it is noted that, in the case that the quantity of the numerals in the resolution list is larger than 32, the number of bits of the binary code is increased correspondingly).

The 32-bit binary code in FIG. 6 corresponds one by one to the numerals (0 to 31) in the above resolution list. In the case that the resolution of the to-be-compressed video data requiring video data processing is 3840×2160 p60, it is determined that the numeral is 6 according to the resolution list, the seventh bit starting from the rightmost end of the binary code is determined to be 1, and the other 31 bits of the code are 0. Then, the binary code is converted into the hexadecimal code, which is 00000040. Thus, it is known that the identifier corresponding to the resolution of the to-be-compressed video data is determined to be 00000040.

In 3023, the identifier is sent to the apparatus for displaying images.

The identifier acquired in 3021 is sent to a sink, wherein the sink is an apparatus for displaying images, and the apparatus for displaying images determines the resolution of the to-be-compressed video data according to the identifier. In this way, the apparatus for displaying images configures a corresponding decoder according to the resolution.

In 303, the to-be-compressed video data is divided into a plurality of to-be-compressed video data groups based on a luminance difference value and a chroma difference value.

One to-be-compressed video data group includes a plurality of consecutive image frames.

Generally, since the image contents of the plurality of consecutive image frames of the to-be-compressed video data are similar, and adjacent image frames change little, therefore, in several adjacent image frames, in the case that the luminance difference value of the macroblocks at the same position is less than or equal to 2%, and the chroma difference value is less than or equal to 1%, the several adjacent image frames are divided into one group as one to-be-compressed video data group. One piece of to-be-compressed video data is divided into a plurality of to-be-compressed video data groups.

A macroblock refers to one image block in any one of image frames. That is, during a video compression process, each image frame is divided into a plurality of macroblocks, so as to increase a video compression rate. Exemplarily, each image frame is divided into a plurality of non-overlapping 8×8 pixel-sized macroblocks.

In 304, a first outline of the at least one object in an $n^{th}$ image frame of the to-be-compressed video data group is acquired, wherein n≥1.

The first outline of the at least one object in the $n^{th}$ image frame is extracted by an image edge algorithm, and the first outline is configured to represent data information of the at least one object in the $n^{th}$ image frame. In one exemplary embodiment, a first outline of each object in the $n^{th}$ image frame is acquired.

In 305, a second outline of the at least one object in an $(n+1)^{th}$ image frame of the to-be-compressed video data group is acquired by a fuzzy algorithm based on the first outline.

A plurality of consecutive image frames in one to-be-compressed video data group is regarded as images of the at least one object that continuously moves on the same background picture. The second outline of the object has a smaller displacement relative to the first outline. A position of the second outline of the at least one object is determined at a corresponding position in the $(n+1)^{th}$ image frame based on a position of the first outline of the $n^{th}$ image frame and characteristics such as positions and colors of pixels on the first outline.

Figure 7:
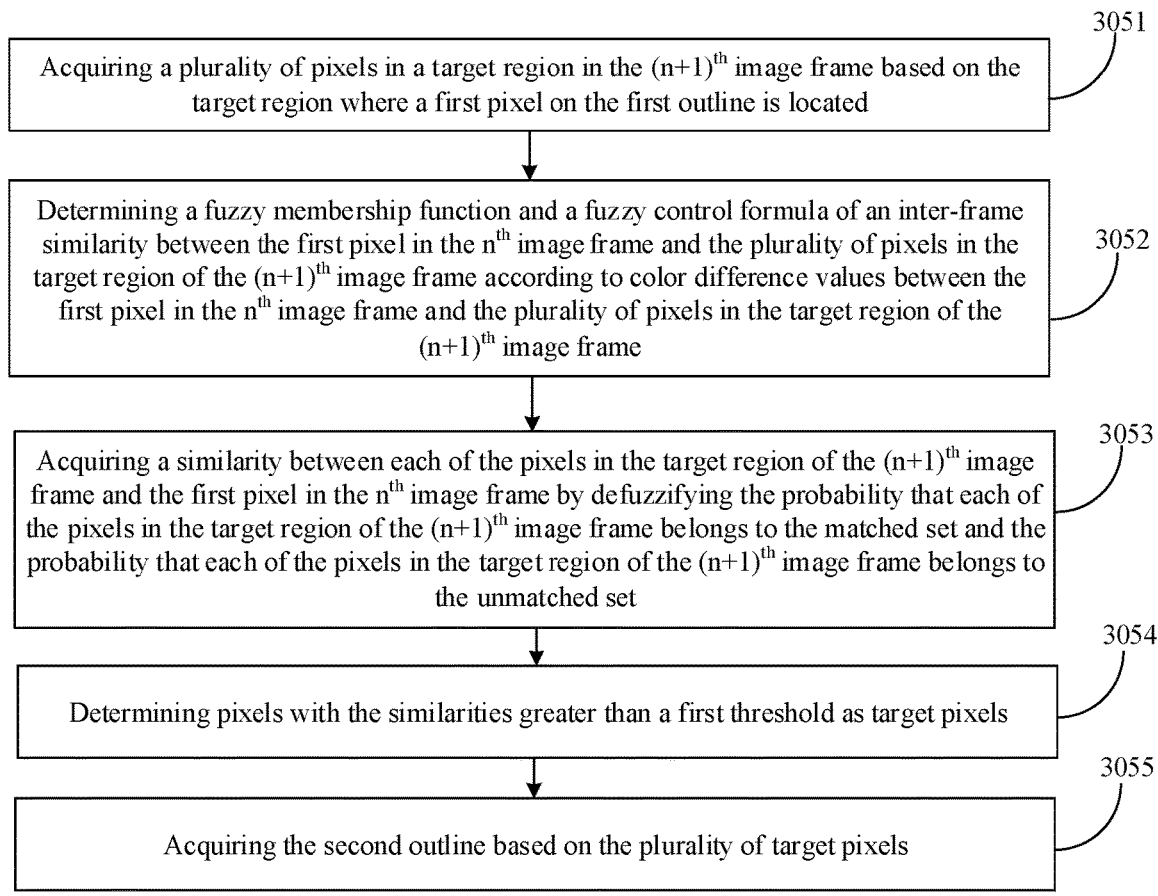
FIG. 7 is a flowchart of acquiring a second outline in the method shown in FIG. 4.

As shown in FIG. 7, step 305 includes the following four sub-steps.

In 3051, a plurality of pixels in a target region in the $(n+1)^{th}$ image frame are acquired based on the target region where a first pixel on the first outline is located.

Images of the to-be-compressed video data group include a plurality of macroblocks, and the target region is a macroblock where the first pixel is located. Alternatively, the target region further includes a macroblock adjacent to the macroblock where the first pixel is located.

In 3052, a fuzzy membership function and a fuzzy control formula of an inter-frame similarity between the first pixel in the image $n^{th}$ frame and the plurality of pixels in the target region of the image $(n+1)^{th}$ frame are determined according to color difference values between the first pixel in the $n^{th}$ image frame and the plurality of pixels in the target region of the $(n+1)^{th}$ image frame.

The fuzzy membership function is configured to output, based on difference values between each of the plurality of pixels and the first pixel, a probability that a sub-pixel of each of the pixels belongs to a negative set, a zero set, or a positive set, and the fuzzy control formula is configured to determine, according to an output of the fuzzy membership function, a probability that each of the pixels belongs to a matched set and a probability that each of the pixels belongs to an unmatched set.

That is, whether the plurality of pixels are compressed is determined according to similarities between the first pixel in the $n^{th}$ image frame and the plurality of pixels in the target region of the $(n+1)^{th}$ image frame. In the case that one of the plurality of pixels is substantially consistent with the first pixel, it is considered that the pixel belongs to pixels on an outline of the at least one object in the to-be-compressed video group.

A membership refers to a degree where a certain element belongs to a certain set, namely, the range of the membership is [0, 1]. In the case that the membership is 1, it means that the element completely belongs to the set. In the case that the membership is 0, it means that the element does not belong to the set at all. Thus, the same element has the same or different memberships to different sets, and different elements have the same or different memberships to the same set. A function describing the membership is referred to as a membership function.

The determination of the membership function is subjective and is generally acquired based on experience or machine learning. Exemplarily, the membership function includes: a triangular membership function, a trapezoidal membership function, a rectangular membership function, a Z-shaped membership function, a Gaussian membership function, an S-shaped membership function, and the like.

In the case of determining the plurality of pixels in the target region in the $(n+1)^{th}$ image frame, several following steps are included.

1) The fuzzy membership function of an inter-frame similarity between the first pixel in the $n^{th}$ image frame and the plurality of pixels in the target region of the $(n+1)^{th}$ image frame is determined according to color difference values between the first pixel in the $n^{th}$ image frame and the plurality of pixels in the target region of the $(n+1)^{th}$ image frame. The color difference value refers to a difference value between the first pixel in the $n^{th}$ image frame and each of the plurality of pixels in the target region of the $(n+1)^{th}$ image frame on three color components of red (R), green (G), and blue (B), as shown in the following formula:

$$\begin{cases} dif_R = p_R - seed_R \\ dif_G = p_G - seed_G, \\ dif_B = p_B - seed_B \end{cases}$$

wherein $dif_R$, $dif_G$, and $dif_B$ respectively refer to difference values between the first pixel in the $n^{th}$ image frame and each of the plurality of pixels in the $(n+1)^{th}$ image frame on the three color components of red (R), green (G), and blue (B); ranges of $dif_R$, $dif_G$, and $dif_B$ are −255 to 255; $p_R$, $p_G$, and $p_B$ respectively refer to the three color components of red (R), green (G), and blue (B) of each of the plurality of pixels in the $(n+1)^{th}$ image frame, and ranges of $p_R$, $p_G$, and $p_B$ are 0 to 255;

and $seed_R$, $seed_G$, and $seed_B$ respectively refer to the three color components of red (R), green (G), and blue (B) of the first pixel in the $n^{th}$ image frame, and ranges of $seed_R$, $seed_G$, and $seed_B$ are 0 to 255.

Figure 8:
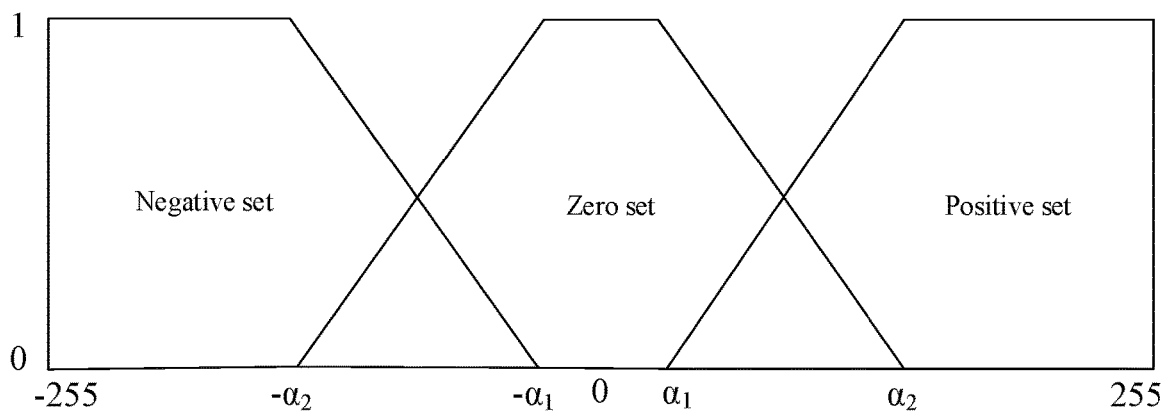
FIG. 8 is a schematic diagram of an input fuzzy set of a trapezoidal membership function according to embodiments of the present disclosure.

Exemplarily, as shown in FIG. 8, FIG. 8 is a schematic diagram of an input fuzzy set of a trapezoidal membership function according to embodiments of the present disclosure. The abscissa represents the value of $dif_R$, $dif_G$, or $dif_B$, and the ordinate represents the membership at which the plurality of pixels belong to a negative set, a zero set, or a positive set. The embodiments of the present disclosure select the trapezoidal membership function to determine an input fuzzy set. The input fuzzy set includes a negative set, a zero set, or a positive set.

The fuzzy membership functions corresponding to the negative set, the zero set, and the positive set are respectively $μN(x)$, $μZ(x)$, and $μP(x)$. The trapezoidal membership function is as shown in the following equation:

$$\mu_N(x) = \begin{cases} 1, & -255 \le x < -\alpha_2 \\ \frac{x+\alpha_1}{\alpha_1-\alpha_2}, & -\alpha_2 \le x < -\alpha_1 \\ 0, & -\alpha_1 \le x \le 255 \end{cases}$$

$$\mu_Z(x) = \begin{cases} 0, & -255 \le x < -\alpha_2 \\ \frac{x+\alpha_2}{\alpha_2-\alpha_1}, & -\alpha_2 \le x < -\alpha_1 \\ 1, & -\alpha_1 \le x \le \alpha_1 \\ \frac{x-\alpha_1}{\alpha_2-\alpha_1}, & \alpha_1 \le x < \alpha_2 \\ 0, & \alpha_2 \le x \le 255 \end{cases} ; \text{and}$$

$$\mu_P(x) = \begin{cases} 0, & -255 \le x < -\alpha_1 \\ \frac{x-\alpha_1}{\alpha_2-\alpha_1}, & \alpha_1 \le x < \alpha_2 \\ 1, & \alpha_2 \le x \le 255 \end{cases}.$$

Thresholds of the three sets of the trapezoidal membership functions are $-\alpha_2$, $-\alpha_1$, $\alpha_1$, and $\alpha_2$. The thresholds are set according to experience or a result of machine learning. That is, in the case that $dif_R$, $dif_G$, or $dif_B$ is within [−255 to $-\alpha_2$], $dif_R$, $dif_G$, or $dif_B$ belongs to the negative set; in the case that $dif_R$, $dif_G$, or $dif_B$ is within $[-\alpha_2$ to $-\alpha_1]$, $dif_R$, $dif_G$, or $dif_B$ belongs to the negative set or the positive set; and similarly, in the case that $dif_R$, $dif_G$, or $dif_B$ is within another interval, $dif_R$, $dif_G$, or $dif_B$ belongs to different sets. x is any of $dif_R$, $dif_G$, or $dif_B$.

2) The fuzzy control formula of an inter-frame similarity between the first pixel and the plurality of pixels is determined according to color difference values between the first pixel in the $n^{th}$ image frame and the plurality of pixels in the target region of the $(n+1)^{th}$ image frame.

That is, in the case that $dif_R$, $dif_G$, and $dif_B$ all belong to the zero set, an output is a matched set.

In the case that $dif_R$, $dif_G$, or $dif_B$ belongs to the negative set or positive set, an output is an unmatched set.

Figure 9:
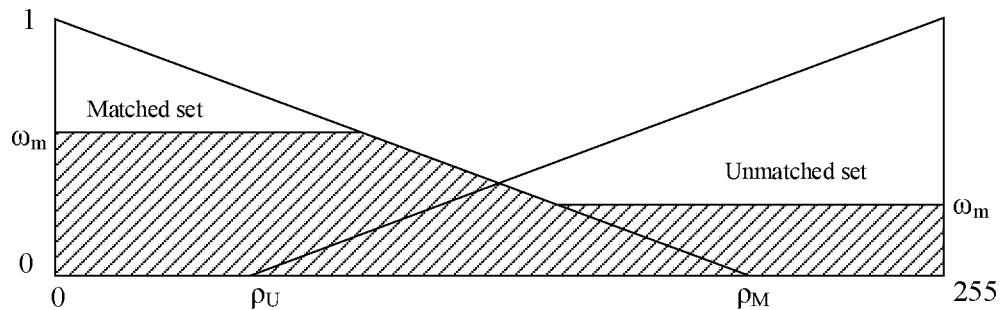
FIG. 9 is a schematic diagram of an output fuzzy set according to embodiments of the present disclosure.

As shown in FIG. 9, FIG. 9 is a schematic diagram of an output fuzzy set according to embodiments of the present disclosure. The abscissa represents an absolute value of $dif_R$, $dif_G$, or $dif_B$, and the ordinate represents a probability that the plurality of pixels belong to the matched set or the unmatched set. $ρ_M$ and $ρ_U$ represent thresholds of the matched set or the unmatched set respectively. The thresholds are set according to experience or a result of machine learning, wherein $μ_M+ρ_U=255$, such that areas of the matched set or the unmatched set is made equal. The fuzzy control formula is as shown in the following formula:

$ω_m=\min\{μ_Z(R),μ_Z(G),μ_Z(B)\}$ $ω_u=\max\{μ_N(R),μ_N(B),μ_P(R),μ_P(G),μ_P(B)\}$ wherein $ω_m$ and $ω_u$ are respectively referred to as weights of the matched set or the unmatched set, that is, $ω_m$ and $ω_u$ are configured to represent probabilities that the plurality of pixels belong to the matched set or the unmatched set. $μZ(R)$, $μZ(G)$, $μZ(B)$, —$N(R)$, $μN(G)$, $μN(B)$, $μP(R)$, $μP(G)$, and $μP(B)$ are acquired by bringing $dif_R$, $dif_G$ and $dif_B$ as x into the above-mentioned three membership functions respectively.

In 3053, a similarity between each of the pixels in the target region of the $(n+1)^{th}$ image frame and the first pixel in the $n^{th}$ image frame by defuzzifying the probability that each of the pixels in the target region of the $(n+1)^{th}$ image frame belongs to the matched set and the probability that each of the pixels in the target region of the $(n+1)^{th}$ image frame belongs to the unmatched set.

It is considered that in the case that a similarity between a certain pixel in the target region of the $(n+1)^{th}$ image frame and the first pixel in the $n^{th}$ image frame is relatively large, and the inter-frame motion vector in step 306 is acquired according to the second outline determined according to the pixel, an acquired result is relatively accurate. On the contrary, in the case that the similarity between the certain pixel in the target region of the $(n+1)^{th}$ image frame and the first pixel in the $n^{th}$ image frame is relatively small, and the inter-frame motion vector in step 306 is acquired according to the second outline determined according to the pixel, an acquired result is relatively inaccurate. Therefore, the similarity between the pixel in the target region of the $(n+1)^{th}$ image frame and the first pixel in the $n^{th}$ image frame is determined, such that the determined second outline in the $(n+1)^{th}$ image frame is relatively accurate.

The probability that each of the above-mentioned pixels belongs to the matched set and the probability that each above-mentioned pixel belongs to the unmatched set are defuzzified according to a centroid method. A formula of the centroid method is as shown below:

$$\Delta\rho_F = \frac{\int \mu_{out}(x)x\,dx}{\int \mu_{out}(x)\,dx},$$

wherein x represents an absolute value of $dif_R$, $dif_G$, or $dif_B$, which is in a range of [0-255]; $\int μ_{out}(x)dx$ represents an envelope function of a shaded portion as shown in FIG. 9; and $Δρ_F$ is configured to represent a difference value between the first pixel and the plurality of pixels in the $(n+1)^{th}$ image frame.

In 3054, pixels with similarities greater than a first threshold are determined as target pixels, and the second outline is acquired based on the target pixels. That is, the target pixels are pixels, corresponding to the first pixel, in the second outline.

It is understood that the similarities between the first pixel and the plurality of pixels in the $(n+1)^{th}$ image frame are measured based on the difference values between the first pixel and the plurality of pixels in the $(n+1)^{th}$ image frame. In the case that the difference value is relatively large, it indicates that a difference between the pixel value and a reference pixel is obvious, and the similarity is relatively small; and otherwise, the similarity is relatively large.

A second threshold σ is acquired. The second threshold G is set according to experience or a result of machine learning. In the case that $Δρ_F<σ$, it indicates that the similarities between the first pixel and the plurality of pixels in the $(n+1)^{th}$ image frame are greater than the first threshold.

In 3055, the second outline is acquired based on the target pixels.

Pixels, among the plurality of pixels in the $(n+1)^{th}$ image frame, having similarities with the first pixel greater than the first threshold are determined as the target pixels, that is, the target pixels are pixels, corresponding to the first pixel, in the second outline. In this way, the target pixels are acquired, and then the second outline is acquired.

In step 306, the motion vector of the at least one object is determined based on the first outline and the second outline.

A direction and a distance of movement of the at least one object are determined based on a difference value in positions of the first outline and the second outline, such that the motion vector of the at least one object is acquired. For a plurality of consecutive image frames in one to-be-compressed video data group, compensation data is acquired by removing the same portion from previous and latter adjacent motion vectors. That is, only the compensation data is compressed and stored, and repeated storage of data that needs to be compressed is avoided.

In the embodiments of the present disclosure, the motion vector of the at least one object in the at least two adjacent image frames in the to-be-compressed video data group is acquired based on the method disclosed in step 304 to step 306. Further, the motion vector of at least one object in every two adjacent image frames in the to-be-compressed video data group is acquired based on the method disclosed in step 304 to step 306.

In step 307, compressed video data is acquired based on a start image frame of the to-be-compressed video data group and the motion vector of the at least one object in the at least two adjacent image frames.

Further, compressed video data is acquired based on the start image frame of the to-be-compressed video data group and the motion vector of the at least one object in every two adjacent image frames in the to-be-compressed video data group.

The start image frame is also be referred to as a key image frame. The start image frame describes detailed information of an image background and the at least one object. It is understood that the image frame is completely retained during the video compression process. For the start image frame, the data of the start image frame is compressed based on an intra-frame compression technology.

Figure 10:
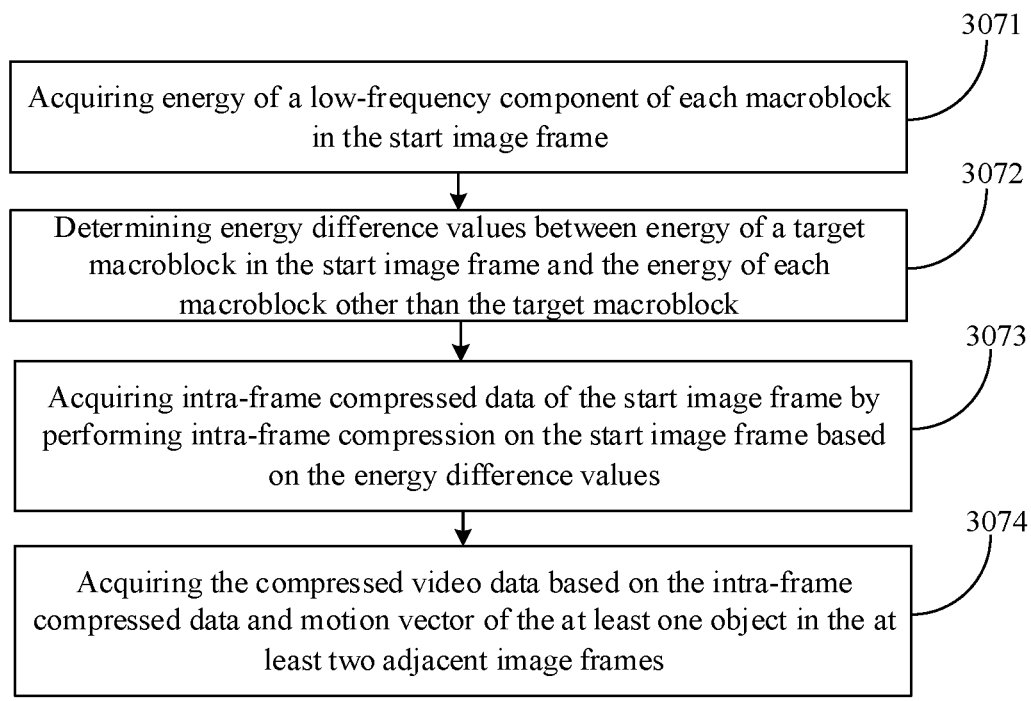
FIG. 10 is a flowchart of acquiring compressed video data in the method shown in FIG. 4.

As shown in FIG. 10, step 307 includes the following four sub-steps.

In 3071, energy of a low-frequency component of each macroblock in the start image frame is acquired.

The start image frame is divided into a plurality of macroblocks (exemplarily, each macroblock contains 4×4 pixels). Conventional wavelet transform is performed on the start image frame, to decompose low-frequency components and high-frequency components in the start image frame. The wavelet transform is to decompose an image signal into a group of wavelets after original wavelet displacement and scaling. Since the wavelet transform divides picture information into the high-frequency components and the low-frequency components, wavelets are referred to as an image microscope during an image processing process. The low-frequency component of the image saves outline information of the image, and the high-frequency component of the image saves edge and detail information of the image.

Since the low-frequency components include main gray data of the start image frame, and represent a texture outline in the start image frame, that is, a visual effect of the start image frame is reflected. Therefore, the low-frequency components of the start image frame are extracted from the decomposed image of the start frame, and the energy of the low-frequency component of each macroblock in the start image frame is determined. A formula of determining the energy of the low-frequency component of each macroblock is as shown in the following formula:

$$E(X,Q)=\Sigma_{q\in W}w(q)[C(X,q)]^2,$$

wherein E (X, Q) is configured to represent the energy of the low-frequency component of any macroblock in the start image frame; X is configured to represent any macroblock in the start image frame; Q is configured to represent a local region having a low-frequency component in any macroblock in the start image frame; point q is a point in region Q; C (X, q) is configured to represent a specific pixel value of point q in an image of a low-frequency component of any macroblock in the start image frame; w(q) is configured to represent a weight of point q; and in the case that point q is closer to a reference point, the weight is larger. The reference point is a center point of region Q. It should be noted that the reference point may be another point outside region Q, which is not limited in the embodiments of the present disclosure.

In 3072, energy difference values between energy of a target macroblock in the start image frame and energy of each macroblock other than the target macroblock are determined.

The energy difference value is acquired according to a matching function. The matching function is as shown in the following formula:

$$M(Q) = \frac{2}{E(X, Q) + E(Y, Q)} \sum_{q \in Q} w(q)C(X, q)C(Y, q),$$

wherein E (Y, Q) is configured to represent the energy of the low-frequency component of the target macroblock in the start image frame, which is calculated by referring to the formula of E (X, Q) above; C (X, q) is configured to represent a specific pixel value of point q in an image of the low-frequency component of the target macroblock in the start image frame; and M(Q) represents a matching degree between the energy of each macroblock in the start image frame and the target macroblock in the start image frame.

In 3073, intra-frame compressed data of the start image frame is acquired by performing intra-frame compression on the start image frame based on the energy difference values.

A matching threshold T is set according to experience or a result of machine learning. In the case that the matching degree M(Q) is less than the matching threshold T, it indicates that the energy of the macroblock in the start image frame is greatly different from the energy of the target macroblock in the start image frame, and the macroblock cannot be compressed.

Macroblocks with an energy difference value between energy of the macroblock and energy of the target macroblock greater than a second threshold are determined as data macroblocks; and the data macroblocks are retained, to avoid loss of more image details of the start image frame.

The intra-frame compressed data is acquired based on the target macroblock in the start image frame and the data macroblocks in the start image frame.

In 3074, the compressed video data is acquired based on the intra-frame compressed data and the motion vector of the at least one object in the at least two adjacent image frames.

The motion vector of the at least one object in the at least two adjacent image frames is referred to as inter-frame compressed data, and the compressed video data is acquired by encapsulating the intra-frame compressed data of the start image frame and the inter-frame compressed data.

Further, the motion vector of the at least one object in the every two adjacent image frames is referred to as inter-frame compressed data, and the compressed video data is acquired by encapsulating the intra-frame compressed data of the start image frame and the inter-frame compressed data.

In step 308, the compressed video data is sent to an apparatus for displaying images.

The source sends the compressed video data to the apparatus for displaying images of the sink, and the apparatus for displaying images decodes the compressed video data and then displays a source video.

In conclusion, a method for processing video data is provided in the embodiments of the present disclosure. In the method, a second outline of at least one object in an image $(n+1)^{th}$ frame of a to-be-compressed video data group is acquired based on a fuzzy algorithm; a motion vector of the at least one object is determined according to the second outline and a first outline of the at least one object in an $n^{th}$ image frame of the to-be-compressed video data group; compressed video data is acquired according to the motion vector and a start image frame of to-be-compressed video data; and the compressed video data is sent to an apparatus for displaying images. Therefore, image details in the to-be-compressed video data are retained; data loss of the compressed video data is reduced; the problem of a poor video data processing effect of the method for processing video data probably caused by loss of part of data during compression of a video in the related art is solved; and the display effect of the video data acquired by the method for processing video data is improved.

Figure 11:
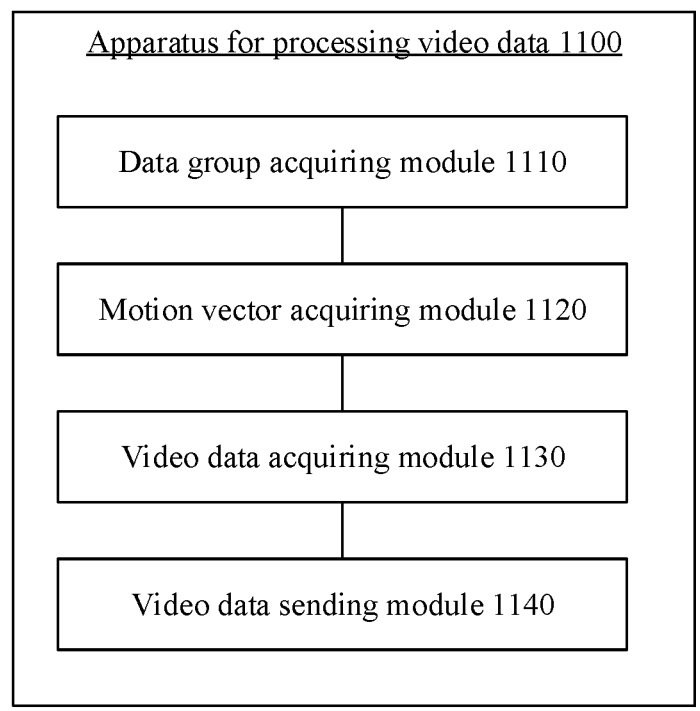
FIG. 11 is a structural block diagram of an apparatus for processing video data according to embodiments of the present disclosure.

FIG. 11 is a structural block diagram of an apparatus for processing video data according to an embodiment of the present disclosure. The apparatus for processing video data 1100 includes:

- a data group acquiring module 1110, configured to acquire a to-be-compressed video data group;
- a motion vector acquiring module 1120, configured to acquire, in the to-be-compressed video data group, a motion vector of at least one object in at least two adjacent image frames;
- a video data acquiring module 1130, configured to acquire compressed video data based on a start image frame of the to-be-compressed video data group and the motion vector of the at least one object in the at least two adjacent image frames; and
- a video data sending module 1140, configured to send the compressed video data to an apparatus for displaying images.

The motion vector acquiring module 1120 includes:

- a first outline acquiring unit, configured to acquire a first outline of the at least one object in an $n^{th}$ image frame of the to-be-compressed video data group, wherein n≥1;
- a second outline acquiring unit, configured to acquire, based on the first outline, a second outline of the at least one object in an $(n+1)^{th}$ image frame of the to-be-compressed video data group by a fuzzy algorithm; and
- a motion vector determining unit, configured to determine the motion vector of the at least one object based on the first outline and the second outline.

Figure 12:
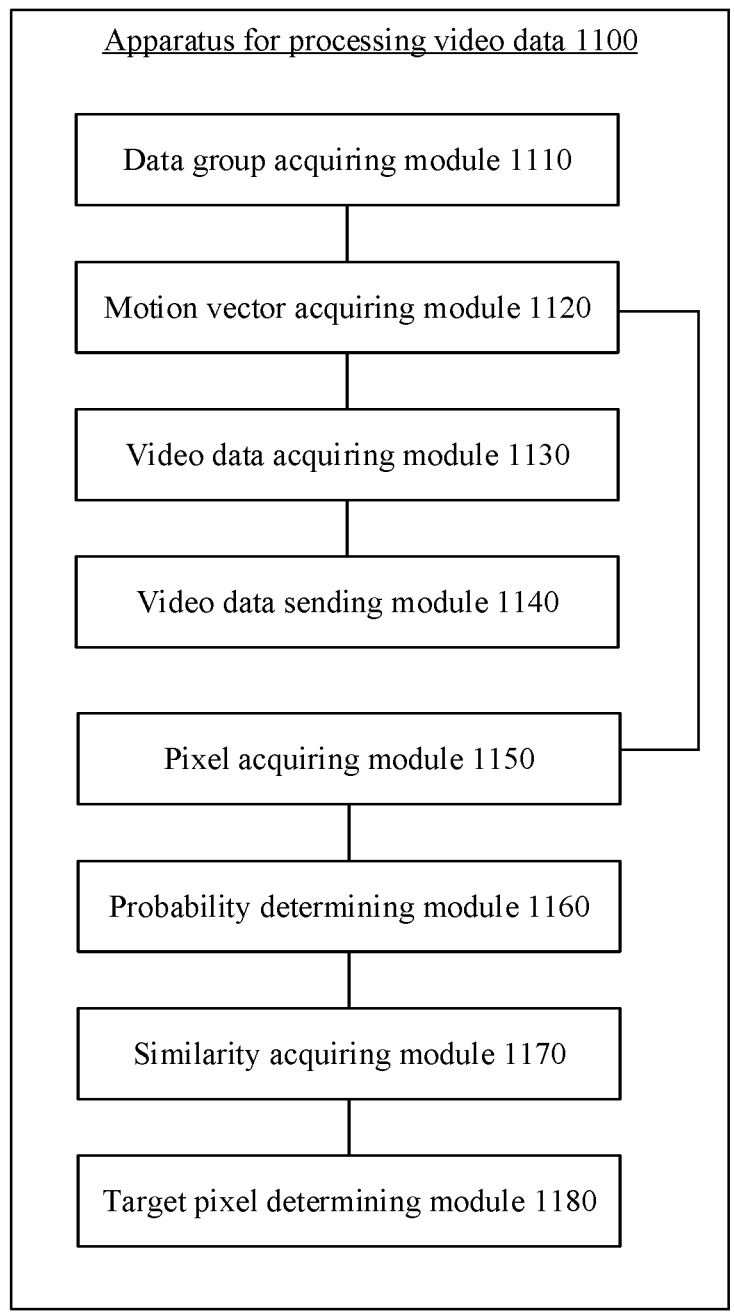
FIG. 12 is a structural block diagram of another apparatus for processing video data according to embodiments of the present disclosure.

Optionally, as shown in FIG. 12, FIG. 12 is a structural block diagram of another apparatus for processing video data according to embodiments of the present disclosure. The apparatus for processing video data 1100 further includes:

- a pixel acquiring module 1150, configured to acquire a plurality of pixels in a target region in the $(n+1)^{th}$ image frame based on the target region where a first pixel on the first outline is located;
- a probability determining module 1160, configured to determine a fuzzy membership function and a fuzzy control formula of an inter-frame similarity between the first pixel and the plurality of pixels according to color difference values between the first pixel and the plurality of pixels, wherein the fuzzy membership function is configured to output, based on difference values between each of the plurality of pixels and the first pixel, a probability that a sub-pixel of each of the pixels belongs to a negative set, a zero set, or a positive set, and the fuzzy control formula is configured to determine, according to an output of the fuzzy membership function, a probability that each of the pixels belongs to a matched set and a probability that each of the pixels belongs to an unmatched set;
- a similarity acquiring module 1170, configured to acquire a similarity between each of the pixels and the first pixel by defuzzifying the probability that each of the pixels belongs to the matched set and the probability that each of the pixels belongs to the unmatched set; and
- a target pixel determining module 1180, configured to determine pixels with similarities greater than a first threshold as target pixels, wherein the target pixels are pixels, corresponding to the first pixel, in the second outline.

In some embodiments, the apparatus for processing video data further includes:

- a to-be-compressed video data acquiring module, configured to acquire to-be-compressed video data; and
- a to-be-compressed video data group acquiring module, configured to divide the to-be-compressed video data into a plurality of to-be-compressed video data groups based on a luminance difference value and a chroma difference value, wherein one to-be-compressed video data group includes a plurality of consecutive image frames.

In summary, an apparatus for processing video data is provided in the embodiments of the present disclosure. In the apparatus, a second outline of at least one object in an $(n+1)^{th}$ image frame of a to-be-compressed video data group is acquired based on a fuzzy algorithm; a motion vector of at least one object is determined according to the second outline and a first outline of the at least one object in an $n^{th}$ image frame of the to-be-compressed video data group; compressed video data is acquired according to the motion vector and a start image frame of to-be-compressed video data; and the compressed video data is sent to an apparatus for displaying images. Therefore, image details in the to-be-compressed video data is retained; data loss of the compressed video data is reduced; the problem of a poor video data processing effect of the method for processing video data probably caused by loss of part of data during compression of a video in the related art is solved; and the display effect of the video data acquired by the method for processing video data is improved.

The embodiments of the present disclosure provide a device for processing video data, including a processor and a memory. The memory stores at least one instruction, at least one program, a code set, or an instruction set, wherein the at least one instruction, the at least one program, the code set, or the instruction set, when loaded and executed by the processor, causes the processor to perform the method for processing video data in any one of the above embodiments.

The embodiments of the present disclosure further provide a computer storage medium. The computer storage medium stores at least one instruction, at least one program, a code set, or an instruction set, wherein the at least one instruction, the at least one program, the code set, or the instruction set, when loaded and executed by the processor, causes the processor to perform the method for processing video data in any one of the above embodiments.

In the present disclosure, the terms "first" and "second" are merely used for descriptive purposes and should not be construed as indicating or implying the relative importance. The term "a plurality of" refers to two or more, unless otherwise explicitly defined.

In the several embodiments provided in the present disclosure, it should be understood that the disclosed apparatus and method are achieved in other manners. For example, the above-described apparatus embodiments are merely illustrative. For example, the division of the units is only one type of logical functional division, and other divisions is achieved in practice. For example, multiple units or components can be combined or integrated into another system, or some features can be omitted, or not executed. In addition, the shown or discussed mutual coupling or direct coupling or communication connection is an indirect coupling or communication connection through some interfaces, apparatuses or units, and is in an electrical, mechanical or other forms.

The units described as separate parts may or may not be physically separated, and parts displayed as units may or may not be physical units, that is, may be located in one position, or may be distributed on multiple network units. A portion of or all of the units are selected according to actual needs to achieve the objective of the solution of this embodiment.

A person of ordinary skill in the art may understand that all or some of the steps of the foregoing embodiments may be implemented by hardware, or may be implemented by a program instructing relevant hardware. The program may be stored in a computer-readable storage medium. The storage medium mentioned above may be a read only memory (ROM), a magnetic disk, an optical disc, or the like.

Described above are merely optional embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A method for processing video data, applicable to a field of video compression and wireless communication, and comprising:
  acquiring a to-be-compressed video data group;
  acquiring, in the to-be-compressed video data group, a motion vector of at least one object in at least two adjacent image frames;
  acquiring compressed video data based on a start image frame of the to-be-compressed video data group and the motion vector of the at least one object in the at least two adjacent image frames; and
  sending the compressed video data to an apparatus for displaying images,
  wherein acquiring, in the to-be-compressed video data group, the motion vector of the at least one object in the at least two adjacent image frames comprises:
  acquiring a first outline of the at least one object in an $n^{th}$ image frame of the to-be-compressed video data group, wherein $n \geq 1$;
  acquiring a second outline of the at least one object by determining, based on a position of the first outline of the $n^{th}$ image frame, and positions and colors of pixels on the first outline, a position of the second outline of the at least one object at a corresponding position in an $(n+1)^{th}$ image frame of the to-be-compressed video data group by a fuzzy algorithm; and
  determining the motion vector of the at least one object based on the first outline and the second outline;
  wherein acquiring a second outline of the at least one object by determining, based on a position of the first outline of the $n^{th}$ image frame, and positions and colors of pixels on the first outline, a position of the second outline of the at least one object at a corresponding position in an $(n+1)^{th}$ image frame of the to-be-compressed video data group by a fuzzy algorithm comprises:
  acquiring a plurality of pixels in a target region in the $(n+1)^{th}$ image frame based on the target region where a first pixel on the first outline is located;
  determining a fuzzy membership function and a fuzzy control formula of an inter-frame similarity between the first pixel and the plurality of pixels according to color difference values between the first pixel and the plurality of pixels, wherein the fuzzy membership function is configured to output, based on difference values between each of the plurality of pixels and the first pixel, a probability that a sub-pixel of each of the pixels belongs to a negative set, a zero set, or a positive set, and the fuzzy control formula is configured to determine, according to an output of the fuzzy membership function, a probability that each of the pixels belongs to a matched set and a probability that each of the pixels belongs to an unmatched set;
  acquiring a similarity between each of the pixels and the first pixel by defuzzifying the probability that each of the pixels belongs to the matched set and the probability that each of the pixels belongs to the unmatched set;
  determining pixels with similarities greater than a first threshold as target pixels; and
  acquiring the second outline based on the target pixels.

2. The method for processing video data according to claim 1, wherein images of the to-be-compressed video data group comprise a plurality of macroblocks, and the target region is a macroblock where the first pixel is located.

3. The method for processing video data according to claim 1, wherein acquiring the to-be-compressed video data group comprises:
  acquiring to-be-compressed video data; and
  dividing the to-be-compressed video data into a plurality of to-be-compressed video data groups based on a luminance difference value and a chroma difference value, wherein one to-be-compressed video data group comprises a plurality of consecutive image frames.

4. The method for processing video data according to claim 2, wherein acquiring the compressed video data based on the start image frame of the to-be-compressed video data group and the motion vector of the at least one object in the at least two adjacent image frames comprises:
- acquiring energy of a low-frequency component of each macroblock in the start image frame;
- determining energy difference values between energy of a target macroblock in the start image frame and energy of each macroblock other than the target macroblock;
- acquiring intra-frame compressed data of the start image frame by performing intra-frame compression on the start image frame based on the energy difference values; and
- acquiring the compressed video data based on the intra-frame compressed data and the motion vector of the at least one object in the at least two adjacent image frames.

5. The method for processing video data according to claim 4, wherein acquiring the intra-frame compressed data of the start image frame by performing the intra-frame compression on the start image frame based on the energy difference values comprises:
- determining macroblocks with an energy difference value between energy of the macroblock and energy of the target macroblock greater than a second threshold as data macroblocks; and
- acquiring the intra-frame compressed data based on the target macroblock and the data macroblocks.

6. The method for processing video data according to claim 1, wherein prior to acquiring the to-be-compressed video data group, the method further comprises:
- acquiring a resolution of the to-be-compressed video data;
- determining, based on a preset resolution list, an identifier corresponding to the resolution; and
- sending the identifier to the apparatus for displaying images.

7. An apparatus for processing video data, comprising:
a processor; and
a memory configured to store one or more instructions executable by the processor;
wherein the processor, when loading and executing the one or more instructions, is caused to perform:
- acquiring a to-be-compressed video data group;
- acquiring, in the to-be-compressed video data group, a motion vector of at least one object in at least two adjacent image frames;
- acquiring compressed video data based on a start image frame of the to-be-compressed video data group and the motion vector of the at least one object in the at least two adjacent image frames; and
- sending the compressed video data to an apparatus for displaying images,
wherein acquiring, in the to-be-compressed video data group, the motion vector of the at least one object in the at least two adjacent image frames comprises:
- acquiring a first outline of the at least one object in an $n^{th}$ image frame of the to-be-compressed video data group, wherein $n \geq 1$;
- acquiring a second outline of the at least one object by determining, based on a position of the first outline of the $n^{th}$ image frame, and positions and colors of pixels on the first outline, a position of the second outline of the at least one object at a corresponding position in an $(n+1)^{th}$ image frame of the to-be-compressed video data group by a fuzzy algorithm; and
- determining the motion vector of the at least one object based on the first outline and the second outline;
wherein acquiring a second outline of the at least one object by determining, based on a position of the first outline of the $n^{th}$ image frame, and positions and colors of pixels on the first outline, a position of the second outline of the at least one object at a corresponding position in an $(n+1)^{th}$ image frame of the to-be-compressed video data group by a fuzzy algorithm comprises:
- acquiring a plurality of pixels in a target region in the $(n+1)^{th}$ image frame based on the target region where a first pixel on the first outline is located;
- determining a fuzzy membership function and a fuzzy control formula of an inter-frame similarity between the first pixel and the plurality of pixels according to color difference values between the first pixel and the plurality of pixels, wherein the fuzzy membership function is configured to output, based on difference values between each of the plurality of pixels and the first pixel, a probability that a sub-pixel of each pixel belongs to a negative set, a zero set, or a positive set, and the fuzzy control formula is configured to determine, according to an output of the fuzzy membership function, a probability that each of the pixels belongs to a matched set and a probability that each of the pixels belongs to an unmatched set;
- acquiring a similarity between each of the pixels and the first pixel by defuzzifying the probability that each of the pixels belongs to the matched set and the probability that each of the pixels belongs to the unmatched set; and
- determining pixels with similarities greater than a first threshold as target pixels, wherein the target pixels are pixels, corresponding to the first pixel, in the second outline.

8. The apparatus for processing video data as defined in claim 7, wherein the processor, when loading and executing the one or more instructions, is caused to perform:
- acquiring to-be-compressed video data; and
- dividing the to-be-compressed video data into a plurality of to-be-compressed video data groups based on a luminance difference value and a chroma difference value, wherein one to-be-compressed video data group comprises a plurality of consecutive image frames.

9. A device for processing video data, comprising a processor and a memory storing at least one instruction, at least one program, a code set, or an instruction set; wherein the at least one instruction, the at least one program, the code set, or the instruction set, when loaded and executed by the processor, causes the processor to perform:
- acquiring a to-be-compressed video data group;
- acquiring, in the to-be-compressed video data group, a motion vector of at least one object in at least two adjacent image frames;
- acquiring compressed video data based on a start image frame of the to-be-compressed video data group and the motion vector of the at least one object in the at least two adjacent image frames; and
- sending the compressed video data to an apparatus for displaying images,
wherein acquiring, in the to-be-compressed video data group, the motion vector of the at least one object in the at least two adjacent image frames comprises:
- acquiring a first outline of the at least one object in an $n^{th}$ image frame of the to-be-compressed video data group, wherein $n \geq 1$;
- acquiring a second outline of the at least one object by determining, based on a position of the first outline of the $n^{th}$ image frame, and positions and colors of pixels on the first outline, a position of the second outline of the at least one object at a corresponding position in an (n+1)$^{th}$ image frame of the to-be-compressed video data group by a fuzzy algorithm; and determining the motion vector of the at least one object based on the first outline and the second outline;

wherein acquiring a second outline of the at least one object by determining, based on a position of the first outline of the n$^{th}$ image frame, and positions and colors of pixels on the first outline, a position of the second outline of the at least one object at a corresponding position in an (n+1)$^{th}$ image frame of the to-be-compressed video data group by a fuzzy algorithm comprises:

acquiring a plurality of pixels in a target region in the (n+1)$^{th}$ image frame based on the target region where a first pixel on the first outline is located;

determining a fuzzy membership function and a fuzzy control formula of an inter-frame similarity between the first pixel and the plurality of pixels according to color difference values between the first pixel and the plurality of pixels, wherein the fuzzy membership function is configured to output, based on difference values between each of the plurality of pixels and the first pixel, a probability that a sub-pixel of each of the pixels belongs to a negative set, a zero set, or a positive set, and the fuzzy control formula is configured to determine, according to an output of the fuzzy membership function, a probability that each of the pixels belongs to a matched set and a probability that each of the pixels belongs to an unmatched set;

acquiring a similarity between each of the pixels and the first pixel by defuzzifying the probability that each of the pixels belongs to the matched set and the probability that each of the pixels belongs to the unmatched set;

determining pixels with similarities greater than a first threshold as target pixels; and acquiring the second outline based on the target pixels.

10. A non-transitory computer storage medium storing at least one instruction, at least one program, a code set, or an instruction set therein, wherein the at least one instruction, the at least one program, the code set, or the instruction set, when loaded and executed by a processor, causes the processor to perform the method for processing video data as defined in claim 1.

11. The apparatus for processing video data according to claim 7, wherein images of the to-be-compressed video data group comprise a plurality of macroblocks, and the target region is a macroblock where the first pixel is located.

12. The apparatus for processing video data according to claim 11, wherein the processor, when loading and executing the one or more instructions, is caused to perform:

acquiring energy of a low-frequency component of each macroblock in the start image frame;

determining energy difference values between energy of a target macroblock in the start image frame and energy of each macroblock other than the target macroblock;

acquiring intra-frame compressed data of the start image frame by performing intra-frame compression on the start image frame based on the energy difference values; and acquiring the compressed video data based on the intra-frame compressed data and the motion vector of the at least one object in the at least two adjacent image frames.

13. The apparatus for processing video data according to claim 12, wherein the processor, when loading and executing the one or more instructions, is caused to perform:

determining macroblocks with an energy difference value between energy of the macroblock and energy of the target macroblock greater than a second threshold as data macroblocks; and acquiring the intra-frame compressed data based on the target macroblock and the data macroblocks.

14. The apparatus for processing video data according to claim 7, wherein the processor, when loading and executing the one or more instructions, is caused to perform:

acquiring a resolution of the to-be-compressed video data;

determining, based on a preset resolution list, an identifier corresponding to the resolution; and sending the identifier to the apparatus for displaying images.

15. The device for processing video data according to claim 9, wherein images of the to-be-compressed video data group comprise a plurality of macroblocks, and the target region is a macroblock where the first pixel is located.

16. The device for processing video data according to claim 9, wherein the at least one instruction, the at least one program, the code set, or the instruction set, when loaded and executed by the processor, causes the processor to perform:

acquiring to-be-compressed video data; and dividing the to-be-compressed video data into a plurality of to-be-compressed video data groups based on a luminance difference value and a chroma difference value, wherein one to-be-compressed video data group comprises a plurality of consecutive image frames.

17. The device for processing video data according to claim 15, wherein the at least one instruction, the at least one program, the code set, or the instruction set, when loaded and executed by the processor, causes the processor to perform:

acquiring energy of a low-frequency component of each macroblock in the start image frame;

determining energy difference values between energy of a target macroblock in the start image frame and energy of each macroblock other than the target macroblock;

acquiring intra-frame compressed data of the start image frame by performing intra-frame compression on the start image frame based on the energy difference values; and acquiring the compressed video data based on the intra-frame compressed data and the motion vector of the at least one object in the at least two adjacent image frames.

* * * * *